(12) United States Patent
Tsujiko

(10) Patent No.: US 10,110,024 B2
(45) Date of Patent: Oct. 23, 2018

(54) ALL-SOLID-STATE BATTERY SYSTEM WITH CHARGE CONTROL BASED ON LIGHT DETECTION

(71) Applicant: Toyota Jidosha Kabushiki Kaisha, Toyota-shi, Aichi-ken (JP)

(72) Inventor: Akira Tsujiko, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 106 days.

(21) Appl. No.: 14/886,573

(22) Filed: Oct. 19, 2015

(65) Prior Publication Data

US 2016/0118820 A1   Apr. 28, 2016

(30) Foreign Application Priority Data

Oct. 22, 2014  (JP) .................. 2014-215580

(51) Int. Cl.
  *H02J 7/00*  (2006.01)
  *H01M 10/42*  (2006.01)
  *H01M 10/44*  (2006.01)
  *H01M 10/48*  (2006.01)

(52) U.S. Cl.
  CPC ....... *H02J 7/0026* (2013.01); *H01M 10/4257* (2013.01); *H01M 10/44* (2013.01); *H01M 10/48* (2013.01); *H02J 7/0021* (2013.01); *H02J 7/0042* (2013.01); *H01M 2010/4271* (2013.01); *H01M 2300/0065* (2013.01)

(58) Field of Classification Search
  CPC ....... Y02E 60/12; H02J 7/0042; H02J 7/0045; H01M 10/44; H01M 10/46

USPC ......................................................... 320/107
See application file for complete search history.

(56) References Cited

U.S. PATENT DOCUMENTS

| | | | |
|---|---|---|---|
| 2001/0019794 A1* | 9/2001 | Horie .................. | H01M 10/488 429/90 |
| 2006/0159986 A1* | 7/2006 | Baba ........................ | G01J 1/42 429/111 |
| 2008/0248335 A1* | 10/2008 | Kinoshita ......... | H01M 10/0418 429/7 |
| 2011/0104546 A1* | 5/2011 | Seino ...................... | B32B 15/08 429/120 |
| 2012/0299529 A1* | 11/2012 | Guo .................... | H01M 10/465 320/101 |
| 2013/0200854 A1* | 8/2013 | Noguchi ............... | H02J 7/0047 320/134 |

(Continued)

FOREIGN PATENT DOCUMENTS

| JP | 2000-048865 A | 2/2000 |
|---|---|---|
| JP | 2000-182662 A | 6/2000 |

(Continued)

*Primary Examiner* — Yalkew Fantu
*Assistant Examiner* — Mohammed J Sharief
(74) *Attorney, Agent, or Firm* — Dinsmore & Shohl LLP

(57) ABSTRACT

An all-solid-state battery system includes: an all-solid-state battery; a light detection unit; and a control unit. The all-solid-state battery includes a battery element having a positive electrode layer, a negative electrode layer and a solid electrolyte layer. The light detection unit detects light emitted from at least one of the positive electrode layer and the negative electrode layer. The control unit controls charge of the all-solid-state battery on the basis of intensity of light detected by the light detection unit.

9 Claims, 4 Drawing Sheets

(56) References Cited

U.S. PATENT DOCUMENTS

2014/0203783 A1* 7/2014 Kiesel ................... H01M 10/42
                                                                320/134
2014/0278229 A1* 9/2014 Hong ..................... A63B 71/06
                                                                702/160

FOREIGN PATENT DOCUMENTS

| JP | 2011-142040 A | 7/2011 |
| JP | 2016018641 A | 2/2016 |

* cited by examiner

ALL-SOLID-STATE BATTERY SYSTEM WITH CHARGE CONTROL BASED ON LIGHT DETECTION

TECHNICAL FIELD

The present invention relates to an all-solid-state battery system.

BACKGROUND ART

A lithium battery is characterized by having high voltage and energy density and less memory effect, and thus, is used for various intended purposes such as power sources of vehicles, mobile devices and the like, and storage batteries in facilities, houses and the like. Accordingly, the study of a lithium battery has been actively conducted. As the use thereof advances, a further improvement in safety and performance has been desired for a lithium battery.

In order to improve safety, an abnormality, such as an overcharge, has to be prevented from occurring in a lithium battery. In a battery using a flammable organic electrolytic solution as an electrolyte, a decomposition additive which decomposes at a predetermined voltage or more to produce gas is added to the electrolytic solution and a pressure-type current interruption mechanism is embedded. By using the pressure-type current interruption mechanism, when the decomposition additive decomposes to produce gas and the pressure increases in the battery, the current interruption mechanism deforms to interrupt a charge current. Accordingly, an overcharge is suppressed and a temperature increase or the like of the battery is prevented from occurring.

On the other hand, as a method for the improvement in the safety and performance, an all-solid-state battery using a solid electrolyte has been studied. An all-solid-state battery is regarded as having higher safety compared with a liquid battery since a flammable organic electrolytic solution is not used, but in order to secure higher safety, it is very important to detect an overcharge with high accuracy and to deal with it. However, since a solvent is not used in an all-solid-state battery, a decomposition additive used in an organic electrolytic solution cannot be used. Even if there is an appropriate decomposition additive which can be used in a solid electrolyte, the number of parts which do not normally contribute to power generation, such as a decomposition additive and a current interruption mechanism, may be increased.

In connection with prevention of an overcharge of an all-solid-state battery, for example, Patent Literature 1 discloses a solid-state battery module. The solid-state battery module is formed by laminating a plurality of solid-state batteries each of which includes a power generation unit and an overcharge prevention unit between a pair of current collectors. The power generation unit includes, for example, a positive electrode layer, a negative electrode layer and a solid electrolyte layer interposed therebetween. The overcharge prevention unit is made from a polymer material whose electric conductivity is increased at a predetermined voltage or more. The purpose of Patent Literature 1 is to easily control an overcharge and to appropriately prevent each single battery from being in an overcharge state.

CITATION LIST

Patent Literature

[Patent Literature 1] Japanese Laid-open Patent Publication No. 2011-142040

SUMMARY OF INVENTION

In the above-described Patent Literature 1, by connecting the overcharge prevention unit to a single cell which is the power generation unit in parallel, an overcharge in the single cell is prevented, and thus, an overcharge in the entire solid-state battery module is prevented. However, the overcharge prevention unit is a part which does not contribute to power generation. In other words, in Patent Literature 1, by providing the part which does not contribute to power generation in each single cell, an overcharge is prevented. Therefore, the number of parts which do not contribute to power generation is increased, and problems, such as a reduction in energy density, increase in manufacturing cost and decrease in productivity may occur. A technique for suppressing overcharge while suppressing an increase in the number of parts, which do not contribute to power generation, is desired.

According to an aspect of the present invention, an all-solid-state battery system including: an all-solid-state battery including a battery element having a positive electrode layer, a negative electrode layer and a solid electrolyte layer; a light detection unit detecting light emitted from at least one of the positive electrode layer and the negative electrode layer; and a charge control unit controlling charge of the all-solid-state battery on the basis of intensity of the light detected by the light detection unit, is provided.

According to another aspect of the present invention, a charge control method of an all-solid-state battery system including an all-solid-state battery including a battery element having a positive electrode layer, a negative electrode layer and a solid electrolyte layer, the charge control method of the all-solid-state battery system including: detecting light emitted from at least one of the positive electrode layer and the negative electrode layer; and controlling charge of the all-solid-state battery on the basis of intensity of the detected light, is provided.

According to the present invention, overcharge can be suppressed while suppressing an increase in the number of parts which do not contribute to power generation.

DESCRIPTION OF EMBODIMENTS

Figure 1:
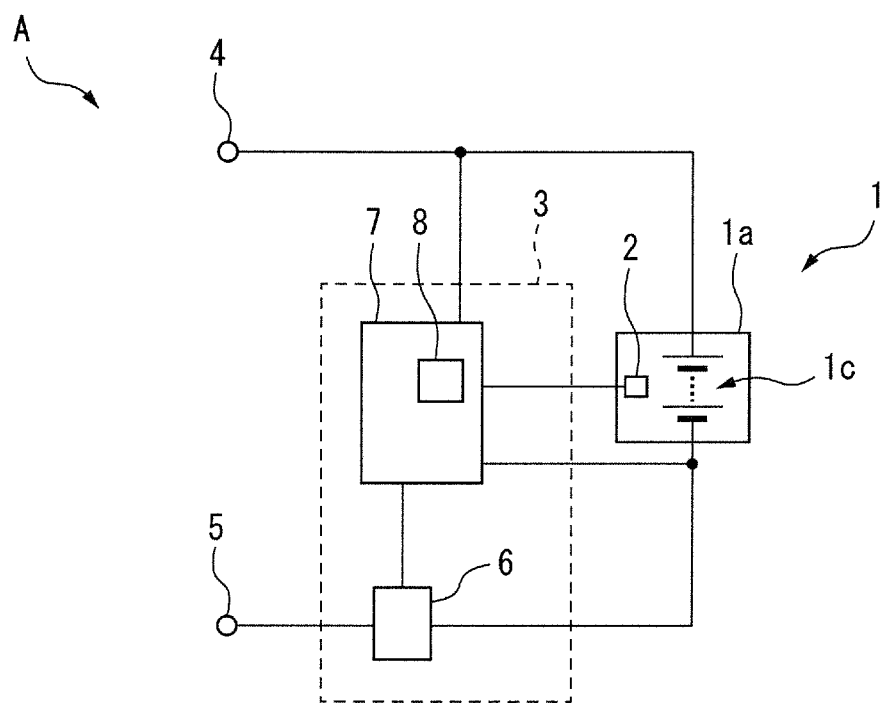
FIG. 1 is a block diagram illustrating a configuration example of an all-solid-state battery system.

According to an aspect of the present invention, an all-solid-state battery system including: an all-solid-state battery including a battery element having a positive electrode layer, a negative electrode layer and a solid electrolyte layer; a light detection unit detecting light emitted from at least one of the positive electrode layer and the negative electrode layer; and a charge control unit controlling charge of the all-solid-state battery on the basis of intensity of the light detected by the light detection unit, is provided.

The inventors has discovered that as an inherent phenomenon in an all-solid-state battery, light emission occurs in a positive electrode layer and a negative electrode layer shortly before an event associated with an overcharge, for example, a reaction, such as decomposition of the materials of the electrodes and electrolyte and generation of other substances, occurs, before the overcharge occurs. For example, it was observed that the light emission occurs in active-material layers of the positive electrode layer and the negative electrode layer and at the interface between the active-material layers and a current collector or a solid electrolyte, and the like. In addition, it was observed that the light emission initially occurs in a part of the positive electrode layer and the negative electrode layer, and occurs in many parts as a battery voltage increases. In other words, it was found that the area of a part where light emits is small initially, but the area of the light emitting part is increased and the light emitting parts are increased as the battery voltage increases, and the area of the part where light emits is increased. The color of the light was, for example, white or yellowish white. Although the reason for the phenomenon occurring is not completely clear, the following reasons are believed to lead to such a phenomenon. An all-solid-state battery has very high stability compared with a secondary battery using an electrolytic solution as an electrolyte, i.e., a liquid secondary battery. Therefore, the event associated with an overcharge occurs in a temperature range of about 200° C. in the liquid secondary battery, and does not occur until a temperature range of 300° C. or more in the all-solid-state battery. In addition, a material which volatilizes and absorbs heat at high temperature, such as an electrolytic solution, exists in the liquid secondary battery, but the all-solid-state battery does not have it. Therefore, the material easily reaches a high temperature in the all-solid-state battery compared with the liquid secondary battery. Accordingly, it is thought that light by black body radiation of the positive electrode layer and the negative electrode layer is observed shortly before the event associated with an overcharge occurs. With the use of the discovery, by detecting light of the positive electrode layer and the negative electrode layer, occurrence of an overcharge in the all-solid-state battery can be easily predicted, charge of the all-solid-state battery can be controlled, i.e., charge can be safely stopped and the amount of charge can be reduced. Since the light emission phenomenon is difficult to be subject to disturbance, occurs before occurrence of the event associated with an overcharge and is easily measured, occurrence of an overcharge can be quickly and correctly suppressed. Accordingly, deterioration of the positive electrode layer, the negative electrode layer, and the solid electrolyte, i.e., deterioration of the all-solid-state battery due to an overcharge can be suppressed, and a life of the all-solid-state battery can be prolonged. In addition, a part which has to be attached to the battery body of the all-solid-state battery is only a part for detecting light, and thus, an increase in the number of parts can be suppressed.

Hereinafter, an all-solid-state battery system according to an embodiment of the present invention will be described with reference to the drawings.

FIG. 1 illustrates an example of a configuration of the all-solid-state battery system according to the embodiment. An all-solid-state battery system A includes an all-solid-state battery 1, a light detection unit 2, and a control unit 3. The all-solid-state battery 1 is a chargeable/dischargeable secondary battery, and has a battery element 1c and a case 1a storing the battery element 1c. The battery element 1c has a positive electrode layer, a negative electrode layer and a solid electrolyte layer interposed between the positive electrode layer and the negative electrode layer. The positive electrode layer is connected to a positive electrode terminal 4, and the negative electrode layer is connected to a negative electrode terminal 5. The light detection unit 2 detects light emitted from at least one of the positive electrode layer and the negative electrode layer. In the example illustrated in FIG. 1, the light detection unit 2 is stored in the case 1a of the all-solid-state battery 1, and a light receiving surface is directed to the front surface or the side surface of the positive electrode layer or the negative electrode layer. The control unit 3 controls charge of the all-solid-state battery 1, on the basis of intensity of the light detected by the light detection unit 2.

The light detection unit 2 receives light emitted from the battery element 1c in the case 1a, and outputs a detection signal corresponding to the intensity of the received light to the control unit 3. Examples of the light detection unit 2 include a semiconductor detector such as a phototransistor, a photodiode and a CCD (Charge Coupled Device), a photomultiplier tube, and a phototube.

The control unit 3 includes a protection unit 7 and a charge stop unit 6.

The protection unit 7 performs control of overcharge protection and overdischarge protection of the all-solid-state battery 1, includes an intensity determination unit 8, and is connected to the light detection unit 2 and the charge stop unit 6. The intensity determination unit 8 determines the intensity of the detected light on the basis of the detection signal from the light detection unit 2, and outputs an overcharge signal when detecting sufficiently intensive light. More specifically, when the intensity of the detected light is larger than predetermined threshold intensity, the intensity determination unit 8 determines that an overcharge is occurring in the all-solid-state battery 1, and outputs the overcharge signal to the charge stop unit 6. For example, when the detection signal has a voltage corresponding to the intensity of the detected light, the threshold intensity is a threshold voltage, and the intensity determination unit 8 compares the voltage of the detection signal with the threshold voltage. Examples of the threshold intensity include the intensity (background) of the light detected by the light detection unit 2 in a non-luminous state in the all-solid-state battery 1 (in a state where the all-solid-state battery 1 is not an overcharge), and intensity obtained by adding a predetermined value to the background in consideration of the possibility of false detection due to noise. In addition, from the viewpoint of preventing false detection, the intensity determination unit 8 may measure the intensity of the light multiple times to calculate average intensity, and compare the average intensity with the threshold intensity. Examples of the protection unit 7 include an electric circuit including a protective IC (Integrated Circuit) or LSI (Large-Scale Integration), which performs overcharge protection and overdischarge protection of the all-solid-state battery 1, and may include an arithmetic processing unit, an input/output unit, and a storage unit. Examples of the intensity determination unit 8 include hardware (circuit) which performs the above-described determination processing on the basis of the comparison result of the voltage of the detection signal with the threshold voltage corresponding to the threshold intensity, in the protection unit 7, and software (program) which operates in the protection unit 7 and performs the above-described comparison processing and determination processing on the basis of the detection signal.

The charge stop unit 6 interrupts the connection between the negative electrode layer of the all-solid-state battery 1 and the negative electrode terminal 5, or limits a flow of a current between the negative electrode layer of the all-solid-state battery 1 and the negative electrode terminal 5 to reduce the amount of charge, on the basis of the overcharge signal from the intensity determination unit 8. Examples of the charge stop unit 6 include a switch element provided on a wire through which a charge current flows, such as a transistor, and a high-resistance element connected in parallel to the wire through which a charge current flows. By turning off a switch on the basis of the overcharge signal, the charge current is interrupted and charge can be stopped. Alternatively, by diverting a charge current to the high-resistance element on the basis of the overcharge signal, the charge current is made difficult to flow, the net charge current is reduced, and the amount of charge can be limited. The charge stop unit 6 is provided on the wire connecting the negative electrode layer of the all-solid-state battery 1 and the negative electrode terminal 5 in the example of FIG. 1. However, the charge stop unit 6 may be provided on the wire connecting the positive electrode layer of the all-solid-state battery 1 and the positive electrode terminal 4.

Figure 2:
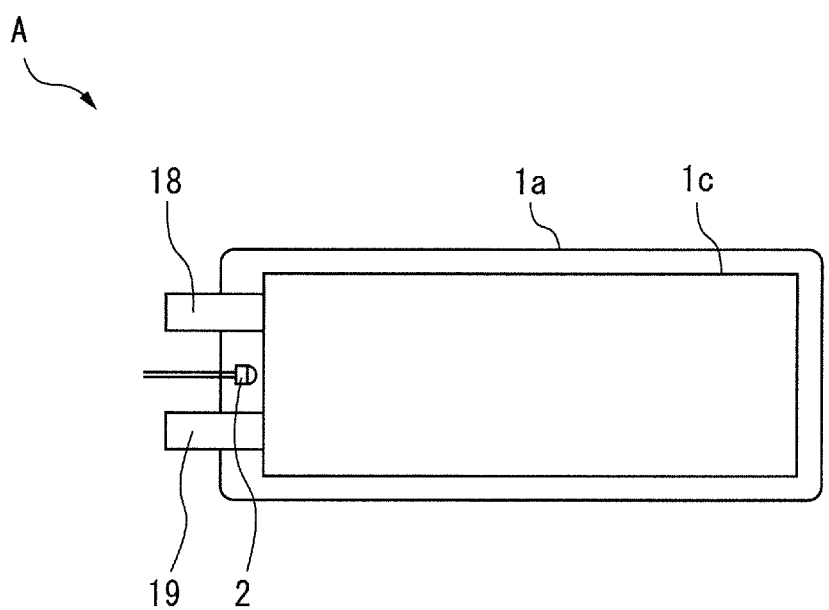
FIG. 2 is a plan view schematically illustrating a configuration example of an all-solid-state battery.

FIG. 2 is a schematic top view illustrating a configuration example of the all-solid-state battery 1 according to the embodiment. In the battery element 1c of the all-solid-state battery 1, a positive electrode tab 18 and a negative electrode tab 19 are provided. The positive electrode tab 18 is a terminal on the positive electrode side of the all-solid-state battery 1. The negative electrode tab 19 is a terminal on the negative electrode side of the all-solid-state battery 1. Examples of the case 1a include a metal case and a laminated film. The case 1a covers the battery element 1c and a part of the positive electrode tab 18 and negative electrode tab 19 from both sides so as to store and protect the battery element 1c and a part of the positive electrode tab 18 and negative electrode tab 19. Examples of the laminated film include an aluminum laminated film and a transparent laminated film (using silica or alumina as a shielding layer). The laminated film on the near side of the drawing is not illustrated in the drawing. In the example of FIG. 2, the light detection unit 2, for example, a phototransistor is stored in the laminated film of the case 1a, and the light receiving surface is directed to the side surfaces of the positive electrode layer and negative electrode layer. Examples of the metal case include a stainless case.

Figure 3:
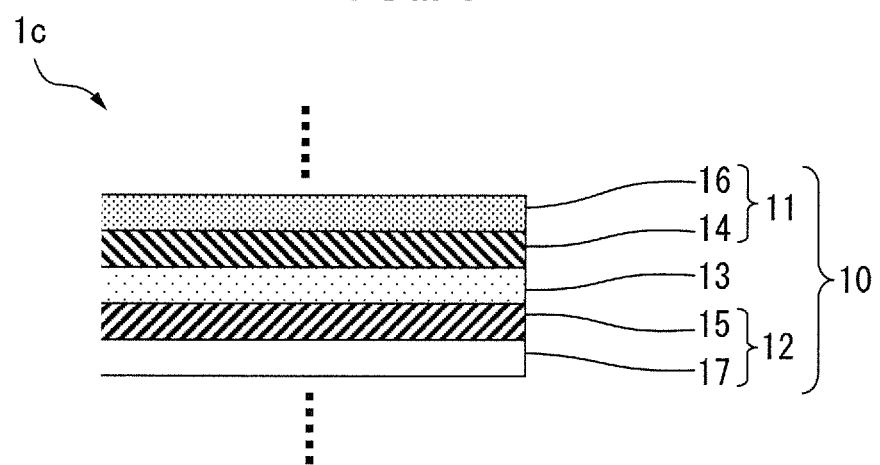
FIG. 3 is a partial cross-sectional view illustrating a configuration example of a battery element.

FIG. 3 is a schematic partial side view illustrating a configuration example of the battery element 1c. The battery element 1c has a configuration in which a plurality of single cells 10 is laminated. The single cell 10 is a chargeable/dischargeable single battery, and includes a positive electrode layer 11, a negative electrode layer 12 and a solid electrolyte layer 13 arranged between the positive electrode layer 11 and the negative electrode layer 12. In the case of the battery element 1c in which the number of the single cells 10 is 1 (one), the single cell 10=the battery element 1c. In addition, the solid electrolyte layer 13 may include a separator. The positive electrode layer 11 includes a positive-electrode active material layer 14 containing a positive-electrode active material and a positive-electrode current collector 16 which performs current collection of the positive-electrode active material layer 14. An extension portion (not illustrated in the drawing) of the positive-electrode current collector 16 is connected to the positive electrode tab 18. The negative electrode layer 12 includes a negative-electrode active material layer 15 containing a negative-electrode active material and a negative-electrode current collector 17 which performs current collection of the negative-electrode active material layer 15. An extension portion of the negative-electrode current collector 17 is connected to the negative electrode tab 19. The adjacent single cells 10 are laminated with a separator sandwiched therebetween, for example.

Figure 4:
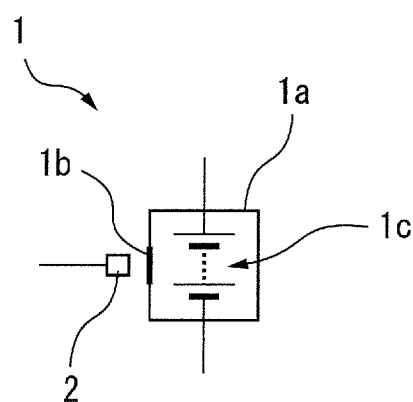
FIG. 4 is a block diagram illustrating another configuration example of the all-solid-state battery and light detection unit.

FIG. 4 is a block diagram illustrating another configuration example of the all-solid-state battery 1. In the example illustrated in FIG. 1, the battery element 1c and the light detection unit 2 are stored in the case 1a. On the other hand, in the example illustrated in FIG. 4, the battery element 1c is stored in the case 1a, but the light detection unit 2 is arranged on the outside of the case 1a. In this case, the light detection unit 2 detects light emission of the battery element 1c through a window region 1b provided in the case 1a. The window region 1b is a region through which light of the battery element 1c can transmit. Examples of the window region 1b include, when the case 1a is a metal case, a glass window framed in the metal case, and, when the case 1a is an aluminum laminated film, a transparent region where aluminum is not partially deposited. The intensity of the light of the battery element 1c is intensive, when a product having a small amount of deposition of aluminum is used as the case 1a, the light emission can be observed through the aluminum laminated film, and the transparent window region 1b does not have to be provided. Alternatively, when a transparent laminated film is used as the case 1a, the light emission can be observed from anywhere, and the transparent window region 1b does not have to be provided. In this case, the light detection unit 2 does not have to be provided in the case 1a, and thus, the manufacture of the all-solid-state battery 1 is easy, and in addition, the flexibility of the arrangement of the light detection unit 2 is increased.

Figure 5:
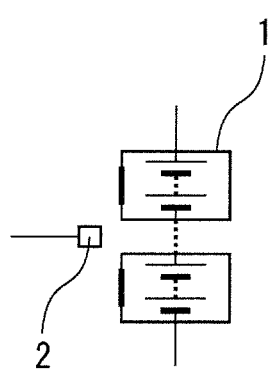
FIG. 5 is a block diagram illustrating further another configuration example of the all-solid-state battery and light detection unit.

FIG. 5 is a block diagram illustrating further another configuration example of the all-solid-state battery 1. In the example illustrated in FIG. 4, the number of the all-solid-state batteries 1 is 1 (one), and the number of the light detection units 2 is 1 (one). In other words, the all-solid-state battery 1 and the light detection unit 2 are 1:1. On the other hand, in the example illustrated in FIG. 5, the number of the all-solid-state batteries 1 is plural, and the number of the light detection units 2 is 1 (one). In other words, the all-solid-state battery 1 and the light detection unit 2 are plural:1. In particular, by using a product having a small amount of deposition of aluminum or using a transparent laminated film as the case 1a, light emission of the plurality of all-solid-state batteries 1 can be easily detected by the one light detection unit 2. Therefore, the number of the light detection units 2 can be reduced, i.e., the manufacturing cost can be reduced.

Next, materials of the battery element 1c will be described.

The materials configuring the positive electrode layer 11, the negative electrode layer 12 and the solid electrolyte layer 13 are not particularly limited as long as a desired all-solid-state battery can be formed. Hereinafter, as a typical example, the positive electrode layer 11, the negative electrode layer 12 and the solid electrolyte layer 13 of an all-solid-state lithium secondary battery will be described.
(Positive Electrode Layer and Negative Electrode Layer)

As described above, the positive electrode layer 11 includes the positive-electrode active material layer 14 and the positive-electrode current collector 16. Furthermore, in the positive electrode layer 11, the extension portion of the positive-electrode current collector 16 is connected to the positive electrode tab 18. As described above, the negative electrode layer 12 includes the negative-electrode active material layer 15 and the negative-electrode current collector 17. Furthermore, in the negative electrode layer 12, the extension portion of the negative-electrode current collector 17 is connected to the negative electrode tab 19.
(Positive-Electrode Active Material Layer)

The positive-electrode active material layer 14 contains a positive-electrode active material and a solid electrolyte.

The positive-electrode active material is not particularly limited as long as it is an active material which can be used for a lithium battery, and examples thereof include compounds of a layered rock salt structure, an olivine structure, a spine structure and the like. Examples thereof include lithium cobalt oxide ($LiCoO_2$), lithium nickel oxide ($LiNiO_2$), lithium manganese oxide ($LiMnO_2$), lithium nickel manganese cobalt oxide ($LiNi_{1-y-z}Co_yMn_zO_2$, for example, $LiNi_{1/3}Co_{1/3}Mn_{1/3}O_2$), lithium nickel cobalt oxide ($LiNi_{1-x}Co_xO_2$), lithium nickel manganese oxide ($LiNi_{1-x}Mn_xO_2$), lithium manganese oxide ($LiMn_2O_4$), lithium manganese oxide compounds ($Li_{1+x}M_yMn_{2-x-y}O_4$; M=Al, Mg, Fe, Cr, Co, Ni, Zn), metal lithium phosphates ($LiMPO_4$, M=Fe, Mn, Co, Ni), metal lithium fluorophosphates ($Li_2MPO_4F$, M=Fe, Mn, Co, Ni), metal lithium phosphates ($Li_2MP_2O_7$, M=Fe, Mn, Co, Ni), lithium titanate ($Li_xTiO_y$) and combinations thereof (examples; mixture thereof, covering material in which one covers another, and the like).

The positive-electrode active material layer 14 further contains a solid electrolyte, preferably a sulfide solid electrolyte, and may further contain other constituents, for example, a conductive auxiliary agent and a binder. The solid electrolyte will be described below. Examples of the conductive auxiliary agent include carbon materials, such as VGCF (Vapor Grown Carbon Fiber), carbon black and graphite, and metal materials. Examples of the binder include polytetrafluoroethylene, styrene-butadiene rubber, butadiene rubber and polyvinylidene fluoride. It is preferable that the ratios of the respective constituent materials in 100 mass % of the positive-electrode active material layer 14 be: the positive-electrode active material is a range of 25 to 90 mass %; the solid electrolyte is a range of 10 to 75 mass %; the conductive auxiliary agent is a range of 0 to 10 mass %; and the binder is a range of 0 to 10 mass %.
(Positive-Electrode Current Collector)

The positive-electrode current collector 16 has a function of performing current collection of the above-described positive-electrode active material layer 14. Examples of the material of the positive-electrode current collector 16 include aluminum, stainless steel, nickel, iron, titanium and the like. In addition, examples of the shape of the positive-electrode current collector 16 include a foil shape, a plate shape, a mesh shape and the like.
(Negative-Electrode Active Material Layer)

The negative-electrode active material layer 15 contains a negative-electrode active material and a solid electrolyte.

The negative-electrode active material is not particularly limited as long as it is an active material which can be used for a lithium battery, and examples thereof include metals, carbon materials and the like. Examples of the metals include metals such as Li, Sn, Si, Al, In and Sb, and alloys obtained by combining some of them. Examples of the carbon materials include carbon materials having a graphite structure (layered structure) at least in a part, more specifically, natural or artificial graphite, soft carbon, hard carbon, low-temperature baked carbon and materials obtained by combining some of them.

The negative-electrode active material layer 15 further contains a solid electrolyte, preferably a sulfide solid electrolyte, and may further contain other constituents, for example, a conductive auxiliary agent and a binder. The solid electrolyte, the conductive auxiliary agent, and the binder are the same as the case of the above-described positive-electrode active material layer 14.
(Negative-Electrode Current Collector)

The negative-electrode current collector 17 has a function of performing current collection of the above-described negative-electrode active material layer 15. As the material of the negative-electrode current collector 17, copper can be used in addition to the material of the positive-electrode current collector 16. As the shape of the negative-electrode current collector 17, one having the same shape as that of the above-described positive-electrode current collector 16 can be adopted.
(Solid Electrolyte Layer)

The solid electrolyte of the solid electrolyte layer 13 is not particularly limited, and examples thereof include inorganic solid electrolytes, such as sulfides, oxides, nitrides, halides and a mixture thereof. In addition, the solid electrolyte may be either crystalline, amorphous or glass ceramics. Examples of the inorganic solid electrolytes include solid sulfide amorphous electrolyte powder such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, $Li_7P_3S_{11}$, $Li_3PS_4$ and $Li_2S$—$P_2S_5$. Furthermore, examples of the inorganic solid electrolytes include solid oxide amorphous electrolyte powder such as $Li_2O$—$B_2O_3$—$P_2O_5$, $Li_2O$—$SiP_2$, $Li_2O_3$ and $Li_2O$—$B_2O_3$—$ZnO$. Furthermore, examples of the inorganic solid electrolytes include solid oxide sulfide amorphous electrolyte powder such as $Li_2O$—$Li_2S$—$P_2S_5$. Furthermore, examples of the inorganic solid electrolytes include crystalline oxide powder, halide powder, nitride powder and oxynitride powder such as $LiI$, $LiI$—$Al_2O_3$, $Li_3N$, $Li_3N$—$LiI$—$LiOH$, $Li_{1.3}Al_{0.3}Ti_{0.7}(PO_4)_3$, $Li_{1+x+y}A_xTi_{2-x}Si_yP_{3-y}O_{12}$ (A=Al or Ga, $0 \le x \le 0.4$, $0 < y \le 0.6$) $[(B_{1/2}Li_{1/2})_{1-z}C_z]TiO_3$ (B=La, Pr, Nd, Sm, C=Sr or Ba, $0 \le x \le 0.5$), $Li_5La_3Ta_2O_{12}$, LiPON, $Li_6BaLa_2Ta_2O_{12}$, $Li_3PO_{(4-3/2w)}N_w$ (W<1) and $Li_{3.6}Si_{0.6}P_{0.4}O_4$. These can also be used as the solid electrolytes of the positive-electrode active material layer 14 and the negative-electrode active material layer 15.
(Other Components)

As other components, a separator (not illustrated in the drawing) may be used for the all-solid-state lithium secondary battery. The separator is arranged between the above-described positive-electrode current collector 16 and negative-electrode current collector 17. Examples of the material of the separator include polyethylene and polypropylene. The above-described separator may be a single-layer structure or may be a multi-layer structure.

It is to be noted that the battery element 1c according to the present embodiment is not necessarily limited to the above-described all-solid-state lithium secondary battery. A solid-state battery unit including at least a positive electrode, a negative electrode and a solid electrolyte interposed between the positive electrode and the negative electrode is included in the battery element 1c according to the present embodiment.

In the all-solid-state battery system of the present embodiment, by providing the light detection unit which detects light from the positive electrode layer or the negative electrode layer of the battery element, a state where an overcharge is occurring can be grasped extremely early. Therefore, occurrence of an overcharge can be surely suppressed while suppressing an increase in the number of parts which do not contribute to power generation, by a part according to the light detection unit. Accordingly, deterioration of the all-solid-state battery due to an overcharge can be suppressed, and a life of the all-solid-state battery can be prolonged.

Next, an example of an operation of the all-solid-state battery system according to the embodiment will be described.

Figure 6:
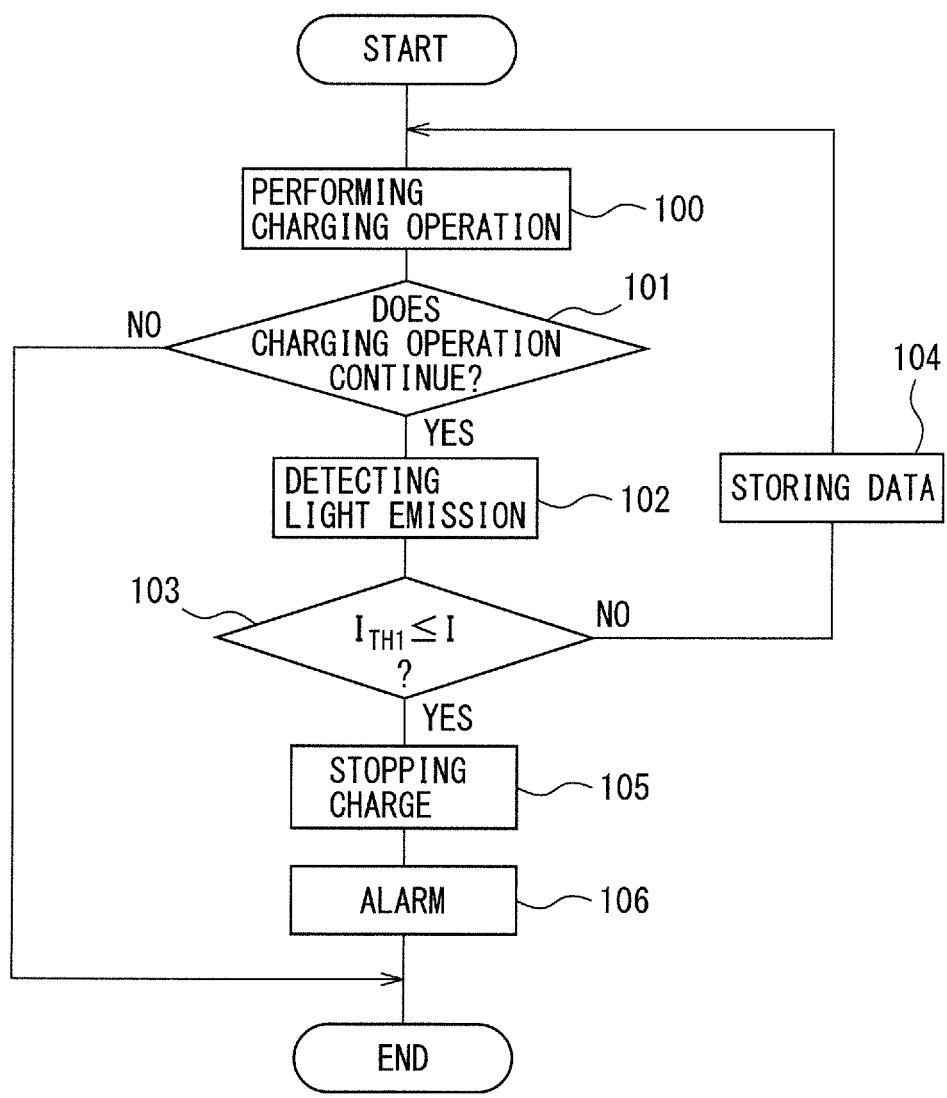
FIG. 6 is a flow chart illustrating an example of a charge control method of the all-solid-state battery.

FIG. 6 is a flow chart illustrating the example of the operation of the all-solid-state battery system according to the embodiment.

In Step 100, the positive electrode terminal 4 and the negative electrode terminal 5 of the all-solid-state battery system A are connected to an external charging apparatus to start a charging operation to the all-solid-state battery system A. The protection unit 7 of the control unit 3 can recognize the charging operation by a voltage applied to the all-solid-state battery 1.

In Step 101, the protection unit 7 determines by the voltage applied to the all-solid-state battery 1, whether or not the charging operation continues. When the charging operation does not continue, the process is ended. When the charging operation continues, the process proceeds to Step 102.

In Step 102, the light detection unit 2 detects light emitted from at least one of the positive electrode layer 11 and the negative electrode layer 12, and outputs a detection signal corresponding to intensity of the received light to the control unit 3.

In Step 103, the intensity determination unit 8 of the protection unit 7 of the control unit 3 determines whether or not the intensity I of the detected light is a predetermined first threshold value $I_{TH1}$ or more, on the basis of the intensity of the detected light. When the intensity I of the detected light is not the first threshold value $I_{TH1}$ or more, the process proceeds to Step 104. When the intensity I of the detected light is the first threshold value or more, the intensity determination unit 8 outputs an overcharge signal to the charge stop unit 6. The process proceeds to Step 105.

In Step 104, the intensity determination unit 8 stores data of the intensity I of the detected light in a storage unit of the protection unit 7. The process returns to Step 100.

In Step 105, on the basis of the overcharge signal, the charge stop unit 6 stops charge of the all-solid-state battery 1 by turning off a switch element, or reduces the amount of charge by diverting a charge current to a high-resistance element to reduce the net charge current, for example.

In Step 106, the intensity determination unit 8 generates an alarm signal indicating occurrence of an overcharge. On the basis of the alarm signal, the protection unit 7 generates an alarm by an alarm generation device (not illustrated in the drawing), or performs alarm display by an alarm display device (not illustrated in the drawing), for example.

In the present embodiment, by observing light emission, a state where an overcharge is occurring in the all-solid-state battery 1 can be detected before an event associated with the overcharge occurs. At this time, a variation of a numerical value, such as a variation of a battery voltage, is not detected but whether or not the positive electrode layer and the negative electrode layer emit light is detected, and thus, the state where an overcharge is occurring or not can be immediately and surely determined. Therefore, in a state where deterioration of the all-solid-state battery 1 due to the overcharge hardly occurs at all, charge can be controlled, i.e., charge can be stopped and the amount of charge can be reduced. Accordingly, deterioration of the all-solid-state battery due to the overcharge can be suppressed, and a life of the all-solid-state battery can be prolonged.

EXAMPLES

Hereinafter, Examples of the present invention will be illustrated. The following Examples are just for illustrative purposes, and do not limit the present invention.

It is to be noted that, in the following respective Examples, measurement of a battery voltage during charge and measurement of illuminance during charge were performed with the following respective devices.

Measurement device of battery voltage during charge: Potentio/galvanostat manufactured by Solartron Measurement device of illuminance during charge: Digital illuminometer 51012 manufactured by YOKOGAWA (a) All-Solid-State Battery $LiNi_{1/3}Co_{1/3}Mn_{1/3}O_2$ whose surface was covered with $LiNbO_3$ having a thickness of 7 nm as a positive-electrode active material, $8Li_2O.67Li_2S.25P_2S_5$ glass as a solid electrolyte and BR as a binder were prepared, these were mixed at 65:30:5 (wt %), and heptane as a solvent was further mixed into the mixture to obtain positive electrode slurry. The positive electrode slurry was applied to aluminum foil as a positive-electrode current collector to obtain a positive electrode layer.

Carbon as a negative-electrode active material, the above-described solid electrolyte ($8Li_2O.67Li_2S.25P_2S_5$ glass) and BR as a binder were prepared, these were mixed at 65:30:5 (wt %), and heptane as a solvent was further mixed into the mixture to obtain negative electrode slurry. The negative electrode slurry was applied to copper foil as a negative-electrode current collector to obtain a negative electrode layer.

20 single cells, each of which is formed by laminating the above-described positive electrode layer and the above-described negative electrode layer with the above-described solid electrolyte interposed therebetween, were laminated to obtain a battery element (size: 50×50×3 mm$^3$).

In the above-described battery element, extension portions of the aluminum foils of the positive-electrode current collectors were joined to a positive electrode tab having a thickness of 200 µm using ultrasonic joining. In addition, extension portions of the copper foils of the negative-electrode current collectors were joined to a negative electrode tab having a thickness of 200 µm using ultrasonic joining.

The above-described battery element including the above-described positive electrode tab and the above-described negative electrode tab was arranged in a sealed case to manufacture an all-solid-state battery.

In the above-described all-solid-state battery, a glass window as a window region capable of measuring light was provided in a part of the sealed case, more specifically, a part facing the side surface of the battery element. In other words, the glass window was provided in the sealed case such that a single cell laminated body can be observed from the side.

(b) Light Emission Measurement

As measurement of light emission which arises in each electrode layer, illuminance of the light in the electrode layer of the above-described single cell laminated body, which is observed from the above-described glass window, was measured using the above-described measurement device of illuminance while charging the above-described all-solid-state battery. Charge conditions were: temperature of laminated cell; 60° C., charge current: 2 C (constant current charge), initial SOC (State of Charge): 30% and end SOC: 200%.

(c) Evaluation Results

Figure 7:
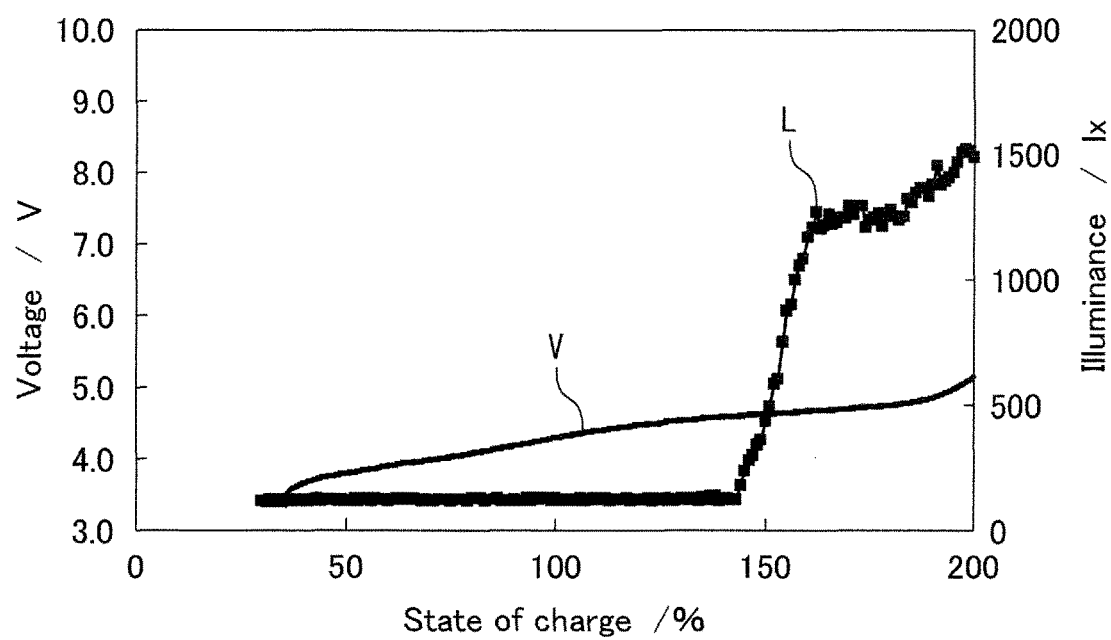
FIG. 7 is a graph illustrating a relationship between a voltage and illuminance of light during charge in Example.

FIG. 7 is a graph illustrating a relationship between a voltage and illuminance of light during charge in Example 1. The left vertical axis, the right vertical axis and the horizontal axis indicate a battery voltage V, illuminance L and SOC, respectively. The battery voltage V of full charge (SOC 100%) was 4.2 V. It is presumed that an event associated with an overcharge, for example, a reaction such as decomposition of the materials of the electrodes and electrolyte and generation of other substances, occurred from when SOC was about 180% and the battery voltage V was about 4.8 V, based on the look of a variation of the battery voltage V. In contrast, light emission of the positive electrode layer arose from when SOC was about 140% and the battery voltage V was about a little less than 4.6 V, became about 500 lx when SOC was about 150% and the battery voltage V was about a little more than 4.6 V, and furthermore reached up to about 1200 lx when SOC was about 160% and the battery voltage V was about 4.7 V. In other words, light emission of the side surface of each electrode body arose before the above-described event associated with an overcharge, and rapidly increased illuminance with respect to a gradual increase of the battery voltage. Therefore, it was found that light emission is characterized by occurring before an event associated with an overcharge, and rapidly increasing illuminance by a slight increase of a battery voltage. According to these characteristics, it was found that an overcharge can be surely and quickly suppressed by measuring light emission. For example, in the case of the all-solid-state battery of FIG. 7, when a first threshold value of illuminance of light is 1000 lx and a second threshold value thereof is 500 lx, by reducing the charge current when the illuminance of light is 500 lx which is the second threshold value, or by interrupting the charge current when the illuminance of light is 1000 lx which is the first threshold value, charge can be stopped before an event associated with an overcharge occurs. Therefore, deterioration of the all-solid-state battery associated with an overcharge can be suppressed. The first threshold value and the second threshold value may be arbitrarily set.

The invention claimed is:

1. An all-solid-state battery system comprising:
an all-solid-state battery including a battery element having a positive electrode layer, a negative electrode layer, and a solid electrolyte layer;
a light detection unit detecting light emitted by black body radiation from at least one of the positive electrode layer and the negative electrode layer; and
a control unit controlling charge of the all-solid-state battery on the basis of intensity of light detected by the light detection unit.

2. The all-solid-state battery system according to claim 1, wherein the control unit comprises:
an intensity determination unit determining whether or not the intensity of light detected by the light detection unit is a predetermined first threshold value or more, and
a charge stop unit stopping charge of the all-solid-state battery or limiting the amount of charge when the intensity of the detected light is the first threshold value or more.

3. The all-solid-state battery system according to claim 1, wherein the all-solid-state battery further comprises:
a case encapsulating the battery element,
wherein the light detection unit is arranged in the case.

4. The all-solid-state battery system according to claim 1, wherein the all-solid-state battery further comprises:
a case encapsulating the battery element and having a window region through which light can transmit,
wherein the light detection unit is arranged on the outside of the case and in the vicinity of the window region.

5. The all-solid-state battery system according to claim 1, wherein the all-solid-state battery further comprises:
a case encapsulating the battery element and being formed of a material through which light can transmit,
wherein the light detection unit is arranged on the outside of the case.

6. The all-solid-state battery system according to claim 4, further comprising:
a plurality of all-solid-state batteries including the all-solid-state battery; and
at least one light detection unit including the light detection unit with respect to the plurality of all-solid-state batteries.

7. A charge control method of an all-solid-state battery system having an all-solid-state battery including a battery element having a positive electrode layer, a negative electrode layer and a solid electrolyte layer,
the charge control method comprising:
detecting light emitted by black body radiation from at least one of the positive electrode layer and the negative electrode layer; and
controlling charge of the all-solid-state battery on the basis of intensity of the detected light.

8. The charge control method of the all-solid-state battery system according to claim 7, wherein the step of controlling charge comprises:
stopping the charge of the all-solid-state battery or reducing the amount of charge, when the intensity of the detected light is a predetermined first threshold value or more.

9. The all-solid-state battery system according to claim 5, further comprising:
a plurality of all-solid-state batteries including the all-solid-state battery; and
at least one light detection unit including the light detection unit with respect to the plurality of all-solid-state batteries.

* * * * *

UNITED STATES PATENT AND TRADEMARK OFFICE
CERTIFICATE OF CORRECTION

PATENT NO. : 10,110,024 B2
APPLICATION NO. : 14/886573
DATED : October 23, 2018
INVENTOR(S) : Akira Tsujiko Page 1 of 1

It is certified that error appears in the above-identified patent and that said Letters Patent is hereby corrected as shown below:

In the Specification

In Column 8, Line 40, delete "$Li_2O$-$SiP_2$, $Li_2O_3$" and insert --$Li_2O$-$SiO_2$, $Li_2O$-$B_2O_3$--, therefor.

In Column 8, Line 49, before "LiPON", insert --$Li_7La_3Zr_2O_{12}$--.

In Column 9, Line 47, after "value", insert --$I_{TH1}$--.

Signed and Sealed this
First Day of January, 2019

Andrei Iancu
*Director of the United States Patent and Trademark Office*